United States Patent
Ishikawa

(10) Patent No.: US 7,397,332 B2
(45) Date of Patent: Jul. 8, 2008

(54) HIGH-FREQUENCY DIELECTRIC CERAMIC COMPOSITION, DIELECTRIC RESONATOR, DIELECTRIC FILTER, DIELECTRIC DUPLEXER, AND COMMUNICATION APPARATUS

(75) Inventor: Tatsuya Ishikawa, Higashiomi (JP)

(73) Assignee: Murata Manufacturing Co., Ltd (JP)

( * ) Notice: Subject to any disclaimer, the term of this patent is extended or adjusted under 35 U.S.C. 154(b) by 0 days.

(21) Appl. No.: 11/850,445

(22) Filed: Sep. 5, 2007

(65) Prior Publication Data

US 2008/0061905 A1 Mar. 13, 2008

Related U.S. Application Data

(63) Continuation of application No. PCT/JP2006/001743, filed on Feb. 2, 2006.

(30) Foreign Application Priority Data

Mar. 16, 2005 (JP) .............................. 2005-075679

(51) Int. Cl.
*H01P 7/10* (2006.01)
*C04B 35/00* (2006.01)

(52) U.S. Cl. .................... 333/219.1; 333/202; 333/222; 501/135

(58) Field of Classification Search ................. 333/202, 333/219, 219.1, 222; 501/135
See application file for complete search history.

(56) References Cited

U.S. PATENT DOCUMENTS

| | | | | |
|---|---|---|---|---|
| 4,485,180 A | * | 11/1984 | Konoike et al. | |
| 4,585,744 A | * | 4/1986 | Konoike et al. | |
| 4,692,727 A | * | 9/1987 | Wakino et al. | |
| 4,792,537 A | * | 12/1988 | Tamura et al. | |
| 5,407,876 A | * | 4/1995 | Michiura et al. | |
| 6,245,702 B1 | * | 6/2001 | Tatekawa et al. | |
| 6,304,157 B1 | * | 10/2001 | Wada et al. | |
| 6,380,115 B1 | * | 4/2002 | Ishikawa et al. | |
| 6,403,512 B1 | * | 6/2002 | Ishikawa et al. | |
| 6,429,164 B1 | * | 8/2002 | Wada et al. | |

(Continued)

FOREIGN PATENT DOCUMENTS

JP 2001-163665 A 6/2001

(Continued)

OTHER PUBLICATIONS

Written Opinion of the International Searching Authority (Form PCT/ISA/237) for PCT/JP2006/30173.

*Primary Examiner*—Robert J. Pascal
*Assistant Examiner*—Kimberly E Glenn
(74) *Attorney, Agent, or Firm*—Dickstein, Shapiro, LLP.

(57) ABSTRACT

A high-frequency dielectric ceramic composition that has excellent dielectric properties, such as a large $\epsilon_r$, a large Q-value, and a small absolute value of $\tau_f$, even in a high-frequency region, such as a microwave region or a millimeter wave region, and that can be fired at 1400° C. or less, which is much lower than before, is provided.

The high-frequency dielectric ceramic composition contains 100 parts by weight of main component and 0.005-0.300 parts by weight (on a $B_2O_3$ basis) of accessory boron compound. The main component has a composition formula of $(1-y)xCaTi_aO_{1+2a}-(1-y)(1-x)Ca(M1_{z/3}M2_{2/3})_bO_{1+2b}-yL-nAl_cO_{(3+3c)/2}$, wherein x and y denote moles, and x, y, z, a, b, c, and $\alpha$ (wherein $\alpha=(1-y)x$) satisfy the following relationships: $0.56 \leq x \leq 0.8$, $0.08 \leq y \leq 0.18$, $0.980 \leq z < 1.000$, $\alpha \leq 0.65$, $0.985 \leq a \leq 1.05$, $0.9 \leq b \leq 1.02$, and $0.9 \leq c \leq 1.05$.

20 Claims, 1 Drawing Sheet

U.S. PATENT DOCUMENTS

| | | | |
|---|---|---|---|
| 6,487,427 B1 * | 11/2002 | Tatekawa et al. | |
| 6,549,094 B2 * | 4/2003 | Takagi et al. | |
| 6,569,795 B2 * | 5/2003 | Kono et al. | |
| 6,649,553 B2 * | 11/2003 | Sugimoto et al. | 501/136 |
| 6,940,371 B2 * | 9/2005 | Kono et al. | 333/219.1 |
| 6,960,547 B2 * | 11/2005 | Matoba et al. | 501/139 |
| 7,056,852 B2 * | 6/2006 | Tatekawa | 501/135 |

FOREIGN PATENT DOCUMENTS

| | | |
|---|---|---|
| JP | 2001-192265 A | 7/2001 |
| JP | 2002-029837 A | 1/2002 |

* cited by examiner

HIGH-FREQUENCY DIELECTRIC CERAMIC COMPOSITION, DIELECTRIC RESONATOR, DIELECTRIC FILTER, DIELECTRIC DUPLEXER, AND COMMUNICATION APPARATUS

This is a continuation of application Ser. No. PCT/JP2006/301743, filed Feb. 2, 2006.

TECHNICAL FIELD

The present invention relates to a high-frequency dielectric ceramic composition used in a high-frequency region, such as a microwave region or a millimeter wave region, and a dielectric resonator, a dielectric filter, a dielectric duplexer and a communication apparatus, each of which includes the high-frequency dielectric ceramic composition.

BACKGROUND ART

Dielectric ceramics have widely been utilized as materials for dielectric resonators and circuit boards employed in high-frequency regions such as a microwave region and a millimeter wave region.

Such high-frequency dielectric ceramics, particularly for use in dielectric resonators or dielectric filters, should have dielectric properties as follows: (1) a large relative dielectric constant ($\epsilon_r$) to provide for required miniaturization, because the wavelength of an electromagnetic wave is reduced to $1/(\epsilon_r^{1/2})$ in a dielectric material; (2) a small dielectric loss or a large Q-value, and (3) excellent temperature stability of resonance frequency or a temperature coefficient ($\tau_f$) of resonance frequency of about 0 ppm/° C.

$\tau_f$ denotes an inclination (first-order differential coefficient) in the linear approximation of a temperature-resonance frequency curve. $\tau_f$ is calculated by the expression of $\tau_f=(f_{55}-f_{25})/[f_{25}\times(55°\,C.-25°\,C.)]$, wherein $f_{25}$ and $f_{55}$ denote the resonance frequencies at 25° C. and 55° C., respectively.

Heretofore, many high-frequency dielectric ceramic compositions that meet the requirements described above have been proposed. Examples of the high-frequency dielectric ceramic compositions include $CaTiO_3$—$Ca\{Mg_{1/3}(Nb, Ta)_{2/3}\}O_5$-$LnAlO_3$ disclosed in Patent Document 1 and $CaTiO_3$—$Ca\{(Zn,Mg)_{1/3}(Nb, Ta)_{2/3}\}O_5$-$LnAlO_3$ disclosed in Patent Document 2, wherein Ln denotes a rare earth element.

Patent Document 1: Japanese Unexamined Patent Application Publication No. 2001-163665

Patent Document 2: Japanese Unexamined Patent Application Publication No. 2001-192265

DISCLOSURE OF INVENTION

Problems to be Solved by the Invention

In recent years, there has been a growing demand for high performance and competitive pricing in the fields of communication apparatuses and base stations. Thus, high-frequency dielectric ceramics used in these fields must have improved dielectric properties, that is, have large $\epsilon_r$ values, large Q-values, and high temperature stability ($\tau_f$ of about 0 ppm/° C.) in high-frequency regions, as well as lower manufacturing costs.

Among the manufacturing costs of high-frequency dielectric ceramics, the cost of firing process energy accounts for a large proportion of the manufacturing costs. Strategies for reducing the manufacturing costs therefore include reduction of the energy cost of the firing process, which may be achieved by low-temperature firing.

In particular, the manufacturing costs are high in high-frequency dielectric ceramics for use in dielectric resonators having resonance frequencies of about 2 GHz that are used in large base stations. In these high-frequency dielectric ceramics, high-temperature firing of at least 1500° C. is required to ensure uniform sintering and thus provide entirely well sintered ceramics having excellent dielectric properties. Thus, it is important to reduce the firing temperature while the dielectric properties are maintained.

The dielectric ceramic compositions described in Patent Documents 1 and 2 have large $\epsilon_r$ values in the range of 40 to 60 and large Q-values (1 GHz) of at least 30,000. Furthermore, the absolute value of temperature coefficient $\tau_f$ of resonance frequency can be controlled to 30 ppm/° C. or less. Thus, the dielectric ceramic compositions described in Patent Documents 1 and 2 have excellent dielectric properties and high temperature stability. However, because the optimum firing temperature is as high as 1550° C., the energy cost of a firing process is very high and raises the total manufacturing cost.

Patent Documents 1 and 2 propose the addition of 0.01% to 1.0% by weight of $SiO_2$, $MnCO_3$, $B_2O_3$, $NiO$, $CuO$, $Li_2CO_3$, $Pb_3O_4$, $Bi_2O_3$, $V_2O_5$ and $WO_3$ to reduce the firing temperature. However, this reduces the firing temperature by no more than 20° C. or 30° C. Furthermore, this also undesirably reduces the Q-value (1 GHz) below 30,000. Hence, the dielectric ceramic compositions described in Patent Documents 1 and 2 cannot achieve excellent dielectric properties and lower manufacturing cost at the same time.

Accordingly, it is an object of the present invention to provide a high-frequency dielectric ceramic composition that can solve the above-mentioned problems. That is, the present invention provides a high-frequency dielectric ceramic composition that has excellent dielectric properties, such as a large $\epsilon_r$, a large Q-value and a small absolute value of $\tau_f$, even in a high-frequency region, such as a microwave region or a millimeter wave region, and that can be fired at 1400° C. or less, which is much lower than before. Furthermore, it is another object of the present invention to provide a dielectric resonator, a dielectric filter, a dielectric duplexer and a communication apparatus, each including the high-frequency dielectric ceramic composition.

Means for Solving the Problems

A high-frequency dielectric ceramic composition according to a first aspect of the present invention contains 100 parts by weight of main component and 0.005-0.300 parts by weight (on a $B_2O_3$ basis) of accessory boron compound. The main component contains Ca, Ti, M1 (M1 is at least one of Zn and Mg), M2 (M2 is at least one of Nb and Ta), Ln (Ln is at least one of Y, La, Nd, Sm and Pr) and Al. The main component has a composition formula of $(1-y)xCaTi_aO_{1+2a}$-$(1-y)(1-x)Ca(M1_{z/3}M2_{2/3})_bO_{1+2b}$-$yLnAl_cO_{(3+3c)/2}$, wherein x and y denote moles, and x, y, z, a, b, c and $\alpha$ (wherein $\alpha=(1-y)x$) satisfy the following relationships: $0.56 \leq x \leq 0.8$, $0.08 \leq y \leq 0.18$, $0.980 \leq z \leq 1.000$, $\alpha \leq 0.65$, $0.985 \leq a \leq 1.05$, $0.9 \leq b \leq 1.02$, and $0.9 \leq c \leq 1.05$.

A dielectric resonator according to a second aspect of the present invention includes a dielectric ceramic that operates upon electromagnetic coupling with input and output terminals of a dielectric resonator. The dielectric ceramic is formed of a high-frequency dielectric ceramic composition according to the first aspect.

A dielectric filter according to a third aspect of the present invention includes a dielectric resonator according to the second aspect and external couplers to be connected to input and output terminals of the dielectric resonator.

A dielectric duplexer according to a fourth aspect of the present invention includes at least two dielectric filters, input and output connectors each connected to the respective dielectric filters, and an antenna connector connected to the dielectric filters. At least one of the dielectric filters is a dielectric filter according to the third aspect.

A communication apparatus according to a fifth aspect of the present invention includes a dielectric duplexer according to the fourth aspect, a transmission circuit connected to at least one of input and output connectors of the dielectric duplexer, a receiver circuit connected to at least one of input and output connectors that is different from the at least one of input and output connectors connected to the transmission circuit, and an antenna connected to an antenna connector of the dielectric duplexer.

Advantages of the Invention

A high-frequency dielectric ceramic composition according to the present invention contains 100 parts by weight of main component and 0.005-0.300 parts by weight (on a $B_2O_3$ basis) of accessory boron compound. The main component contains Ca, Ti, M1 (M1 is at least one of Zn and Mg), M2 (M2 is at least one of Nb and Ta), Ln (Ln is at least one of Y, La, Nd, Sm and Pr) and Al. The main component has a composition formula of $(1-y)xCaTi_aO_{1+2a}-(1-y)(1-x)Ca(M1_{z/3}M2_{2/3})_bO_{1+2b}-yLnAl_cO_{(3+3c)/2}$, wherein x and y denote moles, and x, y, z, a, b, c, and a (wherein $\alpha=(1-y)x$) satisfy the following relationships: $0.56 \leq x \leq 0.8$, $0.08 \leq y \leq 0.18$, $0.980 \leq z < 1.000$, $\alpha \leq 0.65$, $0.985 \leq a \leq 1.05$, $0.9 \leq b \leq 1.02$, and $0.9 \leq c \leq 1.05$. Hence, the high-frequency dielectric ceramic composition has excellent dielectric properties: a large $\epsilon_r$ of 41-56, a large Q-value (1 GHz) of 30700-37300, and a small $\tau_f$ absolute value of 30 ppm/° C. or less. The high-frequency dielectric ceramic composition can be prepared at a firing temperature in the range of 1300° C. to 1400° C., which is much lower than before.

This low-temperature sintering is achieved by the synergistic effect of the addition of an accessory compound $B_2O_3$ and an atomic ratio of M1 (z/3) less than the stoichiometry of 1/3 in the composition formula of the main component. The z value less than one may compensate a reduction in Q-value caused by the addition of $B_2O_3$.

In general, firing at the maximum temperature exceeding 1400° C. requires a furnace including an expensive $MoSi_2$ (molybdenum silicide) heating element. The furnace including a $MoSi_2$ heating element is small, has low productivity and consumes a greater amount of power to heat to high temperatures. These increase the manufacturing costs. In contrast, when the maximum firing temperature is 1400° C. or less, a dielectric ceramic composition can efficiently be fired in a large furnace including an inexpensive SiC (silicon carbide) heating element. This can reduce the manufacturing cost.

A dielectric ceramic composition according to the present invention has excellent dielectric properties as described above and can be manufactured at much lower manufacturing costs. Hence, the dielectric ceramic composition can reduce the price of dielectric resonators to be mounted on not only small dielectric filters and dielectric duplexers for use in communication apparatuses such as mobile phones, personal radios, and satellite receivers, but also large dielectric filters and dielectric duplexers used in base stations, while their excellent dielectric properties are maintained.

Figure 1:
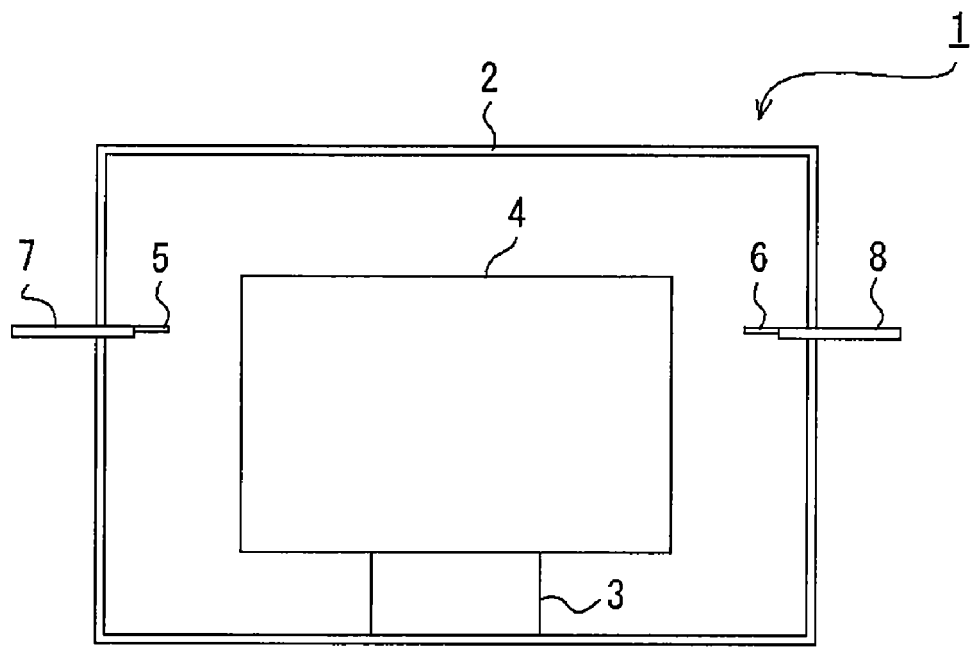
FIG. 1 is a schematic cross-sectional view of a dielectric resonator formed of a high-frequency dielectric ceramic composition according to the present invention.

REFERENCE NUMERALS 1 dielectric resonator
2 metal case
3 support
4 dielectric ceramic
5, 6 coupling loop
7, 8 coaxial cable
10 communication apparatus
12 dielectric duplexer
14 transmission circuit
16 receiver circuit
18 antenna
20 input connector
22 output connector
24 antenna connector
26, 28 dielectric filter
30 external coupler

BEST MODE FOR CARRYING OUT THE INVENTION

A dielectric resonator, a dielectric filter, a dielectric duplexer and a communication apparatus each including a high-frequency dielectric ceramic composition according to an embodiment of the present invention will be described below.

FIG. 1 is a schematic cross-sectional view of a dielectric resonator formed of a high-frequency dielectric ceramic composition according to an embodiment of the present invention.

The dielectric resonator 1 includes a metal case 2 and a columnar dielectric ceramic 4 disposed on a support 3 in the metal case 2. An input terminal is composed of a coaxial cable 7 and a coupling loop 5 disposed between a central conductor and an outer conductor of the coaxial cable 7. An output terminal is composed of a coaxial cable 8 and a coupling loop 6 disposed between a central conductor and an outer conductor of the coaxial cable 8. The input and output terminals are held by the metal case 2 while each of the outer conductors is electrically connected to the metal case 2.

The dielectric ceramic 4 operates upon electromagnetic coupling with the input terminal and the output terminal. Only a signal having a predetermined frequency inputted from the input terminal can be outputted from the output terminal.

The dielectric ceramic 4 in the dielectric resonator 1 is formed of a high-frequency dielectric ceramic composition according to the present invention.

While the dielectric resonator 1 illustrated in FIG. 1 is a resonator of $TE_{01}\delta$ mode used in base stations, a high-frequency dielectric ceramic composition according to the present invention can also be applied to dielectric resonators of TE mode, TM mode and TEM mode.

Figure 2:
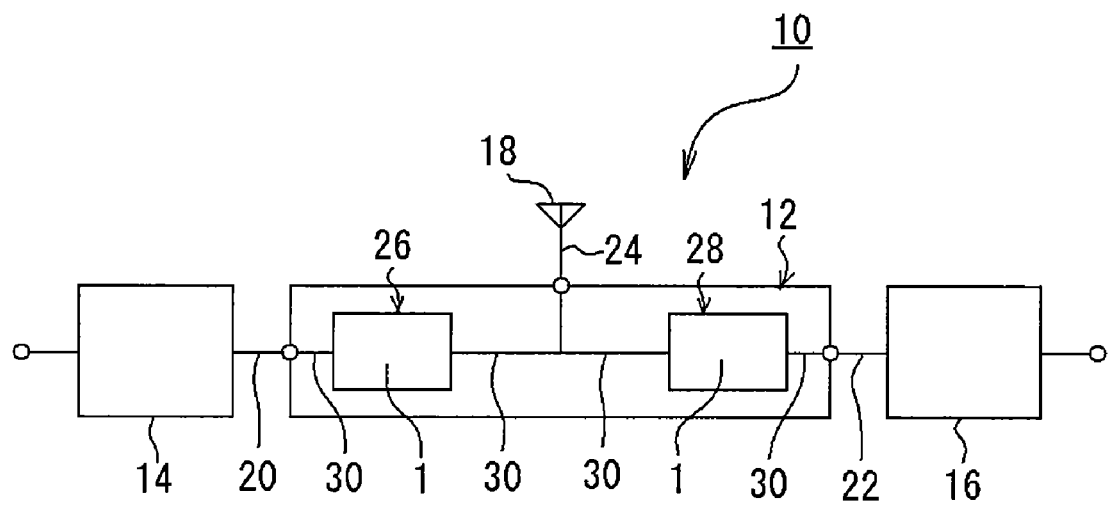
FIG. 2 is a block diagram of a communication apparatus including the dielectric resonator illustrated in FIG. 1.

FIG. 2 is a block diagram of a communication apparatus including the dielectric resonator 1 described above.

The communication apparatus 10 includes a dielectric duplexer 12, a transmission circuit 14, a receiver circuit 16, and an antenna 18.

The transmission circuit 14 is connected to an input connector 20 of the dielectric duplexer 12. The receiver circuit 16 is connected to an output connector 22 of the dielectric duplexer 12.

The antenna 18 is connected to an antenna connector 24 of the dielectric duplexer 12.

The dielectric duplexer 12 includes two dielectric filters 26 and 28. The dielectric filters 26 and 28 include a dielectric resonator according to the present invention and external couplers connected to the dielectric resonator. In the present embodiment, the dielectric filters 26 and 28 include the dielectric resonator 1 illustrated in FIG. 1 and external couplers 30 connected to the input and output terminals of the dielectric resonator 1. The dielectric filter 26 is disposed between the input connector 20 and the dielectric filter 28. The dielectric filter 28 is disposed between the dielectric filter 26 and the output connector 22.

Like the dielectric ceramic 4 in the dielectric resonator 1 illustrated in FIG. 1, a high-frequency dielectric ceramic composition according to the present invention advantageously used in a high-frequency region will be described below.

A high-frequency dielectric ceramic composition according to the present invention contains 100 parts by weight of main component and 0.005-0.300 parts by weight (on a $B_2O_3$ basis) of accessory boron compound. The main component contains Ca, Ti, M1 (M1 is at least one of Zn and Mg), M2 (M2 is at least one of Nb and Ta), Ln (Ln is at least one of Y, La, Nd, Sm and Pr) and Al. The main component has a composition formula of $(1-y)xCaTi_aO_{1+2a}$-$(1-y)(1-x)Ca(M1_{z/3}M2_{2/3})_bO_{1+2b}$-$yLnAl_cO_{(3+3c)/2}$, wherein x and y denote moles, and x, y, z, a, b, c, and α (wherein α=(1−y)x) satisfy the following relationships: $0.56 \leq x \leq 0.8$, $0.08 \leq y \leq 0.18$, $0.980 \leq z < 1.000$, $\alpha \leq 0.65$, $0.985 \leq a \leq 1.05$, $0.9 \leq b \leq 1.02$, and $0.9 \leq c \leq 1.05$.

The present invention will now be further described with examples.

EXAMPLE 1

As starting materials, high purity powders of calcium carbonate ($CaCO_3$), titanium oxide ($TiO_2$), zinc oxide (ZnO), magnesium oxide (MgO), niobium oxide ($Nb_2O_5$), tantalum oxide ($Ta_2O_5$), rare earth (Ln) oxides ($Nd_2O_3$, $Y_2O_3$, $La_2O_3$, $Sm_2O_3$ and $Pr_4O_{11}$), aluminum oxide ($Al_2O_3$) and boron trioxide ($B_2O_3$) were prepared.

The powders were mixed to prepare a dielectric ceramic composition that contained 100 parts by weight of main component having a composition formula of $(1-y)xCaTi_aO_{1+2a}$-$(1-y)(1-x)Ca(M1_{z/3}M2_{2/3})_bO_{1+2b}$-$yNdAl_cO_{(3+3c)/2}$ and 0.025 parts by weight of $B_2O_3$, wherein M1 was at least one of Zn and Mg, M2 was at least one on Nb and Ta, and x, y, z, α, a, b and c (wherein α=(1−y)x) were as listed in Table 1. The starting raw powders were also mixed to prepare a dielectric ceramic composition that contained 100 parts by weight of main component having a composition formula of $0.553CaTiO_3$-$0.297Ca(Zn_{z/3}Nb_{2/3})O_3$-$0.150LnAlO_3$ and 0.025 parts by weight of $B_2O_3$, wherein the rare earth Ln and z were as listed in Table 2. The starting raw powders were also mixed to prepare a dielectric ceramic composition that contained 100 parts by weight of main component having a composition formula of $0.553CaTiO_3$-$0.297Ca(Zn_{0.996/3}Nb_{2/3})O_3$-$0.150NdAlO_3$ and β parts by weight of $B_2O_3$, wherein β was as listed in Table 3.

Each of the mixed powders was wet-blended in a ball mill for 16 hours and was dried.

The dried powder was calcined at a temperature in the range of 1000° C. to 1300° C. for three hours. After the addition of a proper amount of binder, the calcined powder was wet-blended in a ball mill for 16 hours.

The blend was then pressed into a disc at a pressure in the range of $1.47 \times 10^2$ to $2.45 \times 10^2$ MPa. The disc was fired at 1350° C. for four hours in the atmosphere. The resulting discoidal sintered compact had a diameter of 27 mm and a thickness of 14 mm.

The $\epsilon_r$ and Q-value of the sintered compact were determined at a frequency f in the range of 1.8 to 2.2 GHz by a dielectric resonator method (in which both ends of a dielectric resonator are short-circuited) in $TE_{011}$ mode. The Q-value was converted into the Q-value (1 GHz) according to the equation of Q-value×f (frequency)=constant. The resonance frequency was determined by a cavity method in $TE_{01}\delta$ mode. $\tau_f$ was calculated at a temperature range from 25° C. to 55° C.

Tables 1 to 3 show the $\epsilon_r$, Q-value (1 GHz), and $\tau_f$.

TABLE 1

| 試料No. Sample No. | | | 主成分[(1 − y)xCaTi$_a$O$_{1+2a}$ − (1 − y)(1 − x)Ca(M1$_{z/3}$M2$_{2/3}$)$_b$O$_{1+2b}$ − yNdAl$_c$O$_{(3+3c)/2}$]100 重量部 100 parts by weight of main component [(1 − y) × CaTi$_a$O$_{1+2a}$ − (1 − y) (1 − x)Ca(M1$_{z/3}$M2$_{2/3}$)$_b$O$_{1+2b}$ − yNdAl$_c$O$_{(3+3c)/2}$] + 0.025 parts by weight of accessory compound B$_2$O$_3$ | | | | | | | 比誘電率 Dielectric constant | Q値 Q-value [— | 共振周波数の温度係数 Temperature coefficient of resonance frequency $\tau_f$ [ppm/° C] |
|---|---|---|---|---|---|---|---|---|---|---|---|---|
| | Zn | Nb | 0.500 | 0.200 | 1.000 | 0.400 | 1.000 | 1.000 | 1.000 | 39.6 | 19300 | |
| *2 | Zn | Nb | 0.500 | 0.200 | 0.996 | 0.400 | 1.000 | 1.000 | 1.000 | 39.7 | 27800 | −42.8 |
| *3 | Zn | Nb | 0.625 | 0.200 | 1.000 | 0.500 | 1.000 | 1.000 | 1.000 | 43.6 | 20000 | −20.0 |
| *4 | Zn | Nb | 0.625 | 0.200 | 0.996 | 0.500 | 1.000 | 1.000 | 1.000 | 43.6 | 28600 | −19.9 |
| *5 | Zn | Nb | 0.875 | 0.200 | 1.000 | 0.700 | 1.000 | 1.000 | 1.000 | 52.0 | 21500 | 38.6 |
| *6 | Zn | Nb | 0.875 | 0.200 | 0.996 | 0.700 | 1.000 | 1.000 | 1.000 | 52.1 | 30500 | 38.8 |
| *7 | Zn | Nb | 0.710 | 0.180 | 1.000 | 0.582 | 1.000 | 1.000 | 1.000 | 46.5 | 24300 | 1.1 |
| 8 | Zn | Nb | 0.710 | 0.180 | 0.996 | 0.582 | 1.000 | 1.000 | 1.000 | 46.6 | 32800 | 1.3 |
| *9 | Zn | Nb | 0.600 | 0.150 | 1.000 | 0.510 | 1.000 | 1.000 | 1.000 | 45.1 | 27600 | −15.0 |
| 10 | Zn | Nb | 0.600 | 0.150 | 0.996 | 0.510 | 1.000 | 1.000 | 1.000 | 45.3 | 36800 | −14.8 |
| *11 | Zn | Nb | 0.650 | 0.150 | 1.000 | 0.553 | 1.000 | 1.000 | 1.000 | 48.0 | 26800 | −3.0 |
| 12 | Zn | Nb | 0.650 | 0.150 | 0.998 | 0.553 | 1.000 | 1.000 | 1.000 | 48.0 | 31500 | −2.9 |
| 13 | Zn | Nb | 0.650 | 0.150 | 0.996 | 0.553 | 1.000 | 1.000 | 1.000 | 48.0 | 35500 | −2.8 |
| 14 | Zn | Nb | 0.650 | 0.150 | 0.990 | 0.553 | 1.000 | 1.000 | 1.000 | 48.1 | 35300 | −2.7 |
| 15 | Zn | Nb | 0.650 | 0.150 | 0.986 | 0.553 | 1.000 | 1.000 | 1.000 | 48.1 | 33200 | −2.5 |
| 16 | Zn | Nb | 0.650 | 0.150 | 0.980 | 0.553 | 1.000 | 1.000 | 1.000 | 48.1 | 30700 | −2.4 |
| *17 | Zn | Nb | 0.650 | 0.150 | 0.978 | 0.553 | 1.000 | 1.000 | 1.000 | 48.1 | 25600 | −2.2 |
| *18 | Zn | Nb | 0.700 | 0.150 | 1.000 | 0.595 | 1.000 | 1.000 | 1.000 | 49.6 | 26900 | 8.5 |
| 19 | Zn | Nb | 0.700 | 0.150 | 0.996 | 0.595 | 1.000 | 1.000 | 1.000 | 49.8 | 35200 | 8.9 |
| *20 | Zn | Nb | 0.825 | 0.150 | 1.000 | 0.701 | 1.000 | 1.000 | 1.000 | 54.5 | 22200 | 37.8 |

TABLE 1-continued

| Sample No. | | | 100 parts by weight of main component $[(1-y) \times CaTi_aO_{1+2a} - (1-y)(1-x)Ca(M1_{z/3}M2_{2/3})_bO_{1+2b} - yNdAl_cO_{(3+3c)/2}] + 0.025$ parts by weight of accessory compound $B_2O_3$ | | | | | | | Dielectric constant | Q-value | Temperature coefficient of resonance frequency $\tau_f$ [ppm/°C] |
|---|---|---|---|---|---|---|---|---|---|---|---|---|
| *21 | Zn | Nb | 0.825 | 0.150 | 0.996 | 0.701 | 1.000 | 1.000 | 1.000 | 54.6 | 30300 | 38.8 |
| *22 | Zn | Nb | 0.560 | 0.100 | 1.000 | 0.504 | 1.000 | 1.000 | 1.000 | 48.0 | 21700 | −9.0 |
| 23 | Zn | Nb | 0.560 | 0.100 | 0.996 | 0.504 | 1.000 | 1.000 | 1.000 | 48.1 | 31400 | −8.9 |
| *24 | Zn | Nb | 0.600 | 0.100 | 1.000 | 0.540 | 1.000 | 1.000 | 1.000 | 50.8 | 23900 | 1.3 |
| 25 | Zn | Nb | 0.600 | 0.100 | 0.996 | 0.540 | 1.000 | 1.000 | 1.000 | 50.8 | 32500 | 1.5 |
| *26 | Zn | Nb | 0.670 | 0.100 | 1.000 | 0.603 | 1.000 | 1.000 | 1.000 | 53.6 | 21600 | 16.5 |
| 27 | Zn | Nb | 0.670 | 0.100 | 0.996 | 0.603 | 1.000 | 1.000 | 1.000 | 53.7 | 31300 | 16.8 |
| *28 | Zn | Nb | 0.780 | 0.100 | 1.000 | 0.702 | 1.000 | 1.000 | 1.000 | 61.4 | 19300 | 44.0 |
| *29 | Zn | Nb | 0.780 | 0.100 | 0.996 | 0.702 | 1.000 | 1.000 | 1.000 | 61.5 | 25800 | 44.3 |
| *30 | Zn | Nb | 0.550 | 0.080 | 1.000 | 0.506 | 1.000 | 1.000 | 1.000 | 51.1 | 20600 | −5.5 |
| *31 | Zn | Nb | 0.550 | 0.080 | 0.996 | 0.506 | 1.000 | 1.000 | 1.000 | 51.3 | 27800 | −5.3 |
| *32 | Zn | Nb | 0.700 | 0.080 | 1.000 | 0.644 | 1.000 | 1.000 | 1.000 | 56.7 | 21840 | 27.2 |
| 33 | Zn | Nb | 0.700 | 0.080 | 0.996 | 0.644 | 1.000 | 1.000 | 1.000 | 56.8 | 31200 | 27.7 |
| *34 | Zn | Nb | 0.550 | 0.050 | 1.000 | 0.523 | 1.000 | 1.000 | 1.000 | 54.6 | 18500 | 27.8 |
| *35 | Zn | Nb | 0.550 | 0.050 | 0.996 | 0.523 | 1.000 | 1.000 | 1.000 | 54.6 | 27300 | 28.0 |
| *36 | Zn | Nb | 0.600 | 0.050 | 1.000 | 0.570 | 1.000 | 1.000 | 1.000 | 57.5 | 18600 | 50.0 |
| *37 | Zn | Nb | 0.600 | 0.050 | 0.996 | 0.570 | 1.000 | 1.000 | 1.000 | 57.6 | 25900 | 51.5 |
| *38 | Zn | Nb | 0.670 | 0.100 | 1.000 | 0.603 | 0.980 | 1.000 | 1.000 | 52.7 | 17000 | 16.3 |
| *39 | Zn | Nb | 0.670 | 0.100 | 0.996 | 0.603 | 0.980 | 1.000 | 1.000 | 52.7 | 24300 | 16.6 |
| *40 | Zn | Nb | 0.670 | 0.100 | 1.000 | 0.603 | 0.985 | 1.000 | 1.000 | 52.8 | 21900 | 16.1 |
| 41 | Zn | Nb | 0.670 | 0.100 | 0.996 | 0.603 | 0.985 | 1.000 | 1.000 | 52.9 | 31000 | 16.5 |
| *42 | Zn | Nb | 0.670 | 0.100 | 1.000 | 0.603 | 1.050 | 1.000 | 1.000 | 53.7 | 23400 | 16.3 |
| 43 | Zn | Nb | 0.670 | 0.100 | 0.996 | 0.603 | 1.050 | 1.000 | 1.000 | 53.7 | 31700 | 16.7 |
| *44 | Zn | Nb | 0.670 | 0.100 | 1.000 | 0.603 | 1.100 | 1.000 | 1.000 | 53.9 | 19600 | 16.5 |
| *45 | Zn | Nb | 0.670 | 0.100 | 0.996 | 0.603 | 1.100 | 1.000 | 1.000 | 53.9 | 26800 | 16.9 |
| *46 | Zn | Nb | 0.670 | 0.100 | 1.000 | 0.603 | 1.000 | 0.850 | 1.000 | 52.6 | 18300 | 16.3 |
| *47 | Zn | Nb | 0.670 | 0.100 | 0.996 | 0.603 | 1.000 | 0.850 | 1.000 | 52.7 | 25500 | 16.6 |
| *48 | Zn | Nb | 0.670 | 0.100 | 1.000 | 0.603 | 1.000 | 0.900 | 1.000 | 52.9 | 22000 | 17.8 |
| 49 | Zn | Nb | 0.670 | 0.100 | 0.996 | 0.603 | 1.000 | 0.900 | 1.000 | 52.9 | 31600 | 18.0 |
| *50 | Zn | Nb | 0.670 | 0.100 | 1.000 | 0.603 | 1.000 | 1.020 | 1.000 | 53.3 | 22900 | 16.5 |
| 51 | Zn | Nb | 0.650 | 0.100 | 0.996 | 0.603 | 1.000 | 1.020 | 1.000 | 53.4 | 31800 | 16.9 |
| *52 | Zn | Nb | 0.670 | 0.100 | 1.000 | 0.603 | 1.000 | 1.050 | 1.000 | 53.4 | 16300 | 17.3 |
| *53 | Zn | Nb | 0.670 | 0.100 | 0.996 | 0.603 | 1.000 | 1.050 | 1.000 | 53.1 | 23600 | 17.5 |
| *54 | Zn | Nb | 0.670 | 0.100 | 1.000 | 0.603 | 1.000 | 1.000 | 0.850 | 52.6 | 16100 | 16.1 |
| *55 | Zn | Nb | 0.670 | 0.100 | 0.996 | 0.603 | 1.000 | 1.000 | 0.850 | 52.8 | 23000 | 16.3 |
| *56 | Zn | Nb | 0.670 | 0.100 | 1.000 | 0.603 | 1.000 | 1.000 | 0.900 | 53.7 | 24900 | 17.4 |
| 57 | Zn | Nb | 0.670 | 0.100 | 0.996 | 0.603 | 1.000 | 1.000 | 0.900 | 53.8 | 34300 | 17.6 |
| *58 | Zn | Nb | 0.670 | 0.100 | 1.000 | 0.603 | 1.000 | 1.000 | 1.050 | 53.9 | 23500 | 17.0 |
| 59 | Zn | Nb | 0.670 | 0.100 | 0.996 | 0.603 | 1.000 | 1.000 | 1.050 | 53.9 | 32500 | 17.2 |
| *60 | Zn | Nb | 0.670 | 0.100 | 1.000 | 0.603 | 1.000 | 1.000 | 1.100 | 53.8 | 19800 | 17.3 |
| *61 | Zn | Nb | 0.670 | 0.100 | 0.996 | 0.603 | 1.000 | 1.000 | 1.100 | 53.8 | 27700 | 17.7 |
| *62 | 0.9Zn + 0.1Mg | Nb | 0.670 | 0.100 | 1.000 | 0.603 | 1.000 | 1.000 | 1.000 | 52.6 | 22600 | 16.3 |
| 63 | 0.9Zn + 0.1Mg | Nb | 0.670 | 0.100 | 0.996 | 0.603 | 1.000 | 1.000 | 1.000 | 52.7 | 31500 | 16.5 |
| *64 | 0.5Zn + 0.5Mg | Nb | 0.670 | 0.100 | 1.000 | 0.603 | 1.000 | 1.000 | 1.000 | 50.4 | 25100 | 14.9 |
| 65 | 0.5Zn + 0.5Mg | Nb | 0.670 | 0.100 | 0.996 | 0.603 | 1.000 | 1.000 | 1.000 | 50.4 | 33300 | 15.2 |
| *66 | Mg | Nb | 0.670 | 0.100 | 1.000 | 0.603 | 1.000 | 1.000 | 1.000 | 49.2 | 26300 | 14.8 |
| 67 | Mg | Nb | 0.670 | 0.100 | 0.996 | 0.603 | 1.000 | 1.000 | 1.000 | 49.3 | 34600 | 15.1 |
| *68 | 0.9Zn + 0.1Mg | Nb | 0.650 | 0.150 | 1.000 | 0.553 | 1.000 | 1.000 | 1.000 | 47.7 | 26900 | −4.1 |
| 69 | 0.9Zn + 0.1Mg | Nb | 0.650 | 0.150 | 0.996 | 0.553 | 1.000 | 1.000 | 1.000 | 47.8 | 35500 | −3.9 |
| *70 | 0.5Zn + 0.5Mg | Nb | 0.650 | 0.150 | 1.000 | 0.553 | 1.000 | 1.000 | 1.000 | 46.6 | 27800 | −3.0 |
| 71 | 0.5Zn + 0.5Mg | Nb | 0.650 | 0.150 | 0.996 | 0.553 | 1.000 | 1.000 | 1.000 | 46.6 | 36200 | −2.6 |
| *72 | Mg | Nb | 0.650 | 0.150 | 1.000 | 0.553 | 1.000 | 1.000 | 1.000 | 45.5 | 28300 | −5.5 |
| 73 | Mg | Nb | 0.650 | 0.150 | 0.996 | 0.553 | 1.000 | 1.000 | 1.000 | 45.6 | 36800 | −5.2 |
| *74 | Zn | 0.8Nb + 0.2Ta | 0.670 | 0.100 | 1.000 | 0.603 | 1.000 | 1.000 | 1.000 | 51.8 | 23600 | 15.3 |
| 75 | Zn | 0.8Nb + 0.2Ta | 0.670 | 0.100 | 0.996 | 0.603 | 1.000 | 1.000 | 1.000 | 51.9 | 32900 | 15.6 |
| *76 | Zn | Ta | 0.670 | 0.100 | 1.000 | 0.603 | 1.000 | 1.000 | 1.000 | 48.8 | 25700 | 12.4 |
| 77 | Zn | Ta | 0.670 | 0.100 | 0.996 | 0.603 | 1.000 | 1.000 | 1.000 | 48.8 | 34500 | 12.6 |
| *78 | Zn | 0.8Nb + 0.2Ta | 0.650 | 0.150 | 1.000 | 0.553 | 1.000 | 1.000 | 1.000 | 46.1 | 26300 | −4.8 |
| 79 | Zn | 0.8Nb + 0.2Ta | 0.650 | 0.150 | 0.996 | 0.553 | 1.000 | 1.000 | 1.000 | 46.2 | 35600 | −4.5 |
| *80 | Zn | Ta | 0.650 | 0.150 | 1.000 | 0.553 | 1.000 | 1.000 | 1.000 | 42.0 | 28600 | −9.5 |
| 81 | Zn | Ta | 0.650 | 0.150 | 0.996 | 0.553 | 1.000 | 1.000 | 1.000 | 42.1 | 37300 | −9.3 |

TABLE 2

Varying Ln 100 parts by weight of main component
[0.553CaTiO$_3$-0.297Ca(Zn$_{2/3}$Nb$_{2/3}$)O$_3$-0.150LnAlO$_3$]β +
0.025 parts by weight of accessory compound B$_2$O$_3$

| Sample No. | Rare earth Ln | z | Dielectric constant $\epsilon_r$ | Q-value [1 GHz] | Temperature coefficient of resonance frequency $\tau_f$ [ppm/° C.] |
|---|---|---|---|---|---|
| *11 | Nd | 1.000 | 48.0 | 26800 | −3.0 |
| 13 | Nd | 0.996 | 48.0 | 35500 | −2.8 |
| *82 | Y | 1.000 | 41.1 | 23500 | 1.0 |
| 83 | Y | 0.996 | 41.2 | 31800 | 1.2 |
| *84 | 0.1Y + 0.9Nd | 1.000 | 46.6 | 27200 | −2.8 |
| 85 | 0.1Y + 0.9Nd | 0.996 | 46.8 | 35500 | −2.6 |
| *86 | La | 1.000 | 48.8 | 23900 | 1.3 |
| 87 | La | 0.996 | 48.9 | 32200 | 1.5 |
| *88 | 0.1La + 0.9Nd | 1.000 | 48.9 | 27100 | −3.5 |
| 89 | 0.1La + 0.9Nd | 0.996 | 49.0 | 36100 | −3.3 |
| *90 | Sm | 1.000 | 46.0 | 26500 | −2.6 |
| 91 | Sm | 0.996 | 46.2 | 35400 | −2.4 |
| *92 | 0.1Sm + 0.9Nd | 1.000 | 46.8 | 27500 | −3.8 |
| 93 | 0.1Sm + 0.9Nd | 0.996 | 47.0 | 35000 | −3.6 |
| *94 | Pr | 1.000 | 49.0 | 24300 | 6.3 |
| 95 | Pr | 0.996 | 49.1 | 33300 | 6.6 |
| *96 | 0.1Pr + 0.9Nd | 1.000 | 47.5 | 28200 | −2.8 |
| 97 | 0.1Pr + 0.9Nd | 0.996 | 47.5 | 36900 | −2.3 |

TABLE 3

Varying amount of B compound 100 parts by weight of main component
[0.553CaTiO$_3$-0.297Ca(Zn$_{0.996/3}$Nb$_{2/3}$)O$_3$-0.150NdAlO$_3$]
β + β parts by weight of accessory compound B$_2$O$_3$

| Sample No. | β [parts by weight] | Dielectric constant $\epsilon_r$ | Q-value [1 GHz]] | Temperature coefficient of resonance frequency $\tau_f$ [ppm/° C.] |
|---|---|---|---|---|
| *98 | 0.000 | 38.8 | 13600 | 1.5 |
| 99 | 0.005 | 47.3 | 33700 | −2.2 |
| 13 | 0.025 | 48.0 | 35500 | −2.8 |
| 100 | 0.050 | 47.7 | 35100 | −2.0 |
| 101 | 0.100 | 47.5 | 34900 | −1.8 |
| 102 | 0.200 | 47.3 | 33200 | −1.5 |
| 103 | 0.300 | 47.1 | 31600 | −1.1 |
| *104 | 0.350 | 46.0 | 28600 | 1.2 |

In Tables 1 to 3, sample Nos. marked with an asterisk indicate samples outside the scope of the present invention.

Tables 1 to 3 show that dielectric ceramic compositions of sample Nos. 8, 10, 12-16, 19, 23, 25, 27, 33, 41, 43, 49, 51, 57, 59, 63, 65, 67, 69, 71, 73, 75, 77, 79, 81, 83, 85, 87, 89, 91, 93, 95, 97 and 99-103 fired at 1350° C., which was about 200° C. lower than before, within the scope of the present invention, had excellent high-frequency dielectric properties: a relative dielectric constant $\epsilon_r$ as large as 41-56, a Q-value (1 GHz) as large as 30700-37300, and an absolute value of $\tau_f$ as small as 30 ppm/° C. or less.

Samples outside the scope of the present invention will be described below.

As shown in Table 1, samples No. 30 and No. 31, in which x was less than 0.56, had a Q-value (1 GHz) less than 30,000. Samples No. 20 and No. 21, in which x was more than 0.8, had an absolute value of $\tau_f$ more than 30 ppm/° C.

Samples No. 36 and No. 37, in which y was less than 0.08, had a Q-value (1 GHz) less than 30,000 and an absolute value of $\tau_f$ more than 30 ppm/° C. Samples No. 3 and No. 4, in which y was more than 0.18, had a Q-value (1 GHz) less than 30,000.

Sample No. 17, in which z was less than 0.980, had a Q-value (1 GHz) less than 30,000. Samples Nos. 7, 9, 11, 18, 22, 24, 26, 32, 40, 42, 48, 50, 56, 58, 62, 64, 66, 68, 70, 72, 74, 76, 78 and 80 in Table 1 and samples Nos. 82, 84, 86, 88, 90, 92, 94 and 96 in Table 2, in which z was one, had a Q-value (1 GHz) less than 30,000.

Sample No. 29 in Table 1, in which α was more than 0.65, had a Q-value (1 GHz) less than 30,000 and an absolute value of $\tau_f$ more than 30 ppm/° C.

Samples No. 39 and No. 45 in Table 1, in which a was less than 0.985 and more than 1.05, respectively, had a Q-value (1 GHz) less than 30,000.

Samples No. 47 and No. 53 in Table 1, in which b was less than 0.9 and more than 1.02, respectively, had a Q-value (1 GHz) less than 30,000.

Samples No. 55 and No. 61 in Table 1, in which c was less than 0.9 and more than 1.05, respectively, had a Q-value (1 GHz) less than 30,000.

As shown in Table 3, sample No. 98, in which β was less than 0.005, had a relative dielectric constant $\epsilon_r$ less than 40 and a Q-value (1 GHz) less than 30,000. Sample No. 104, in which β was more than 0.300, had a Q-value (1 GHz) less than 30,000.

While the present invention is described with the examples, the present invention is not limited to these examples. Various modifications and changes, including the addition of a trace additive and variations in firing conditions, may be made within the scope of the present invention.

For example, while the accessory boron compound was B$_2$O$_3$ in the examples, a boron compound other than oxides such as B$_4$C also had the same effects as in the examples.

Furthermore, a high-frequency dielectric ceramic composition according to the present invention may contain a small amount of additive provided that the additive does not compromise the objects of the present invention. More specifically, the addition of 0.01-1.00 parts by weight of V$_2$O$_5$, Cr$_2$O$_3$, MnO$_2$, Fe$_2$O$_3$, NiO, CuO, SiO$_2$, Li$_2$O, Pb$_3$O$_4$, Bi$_2$O$_3$, $ZrO_2$ or $WO_3$ can further reduce the firing temperature by 20° C. to 30° C. without impairing the characteristics of a dielectric ceramic. The addition of 1.00-3.00 parts by weight of $BaCO_3$ or $SrCO_3$ permits fine adjustments of $\epsilon_r$ and $\tau_f$, thus achieving excellent high-frequency dielectric properties.

The invention claimed is:

1. A high-frequency dielectric ceramic composition comprising:
100 parts by weight of main component and 0.005-0.300 parts by weight (on a $B_2O_3$ basis) of a boron-containing compound,
wherein the main component has a composition formula of $(1-y)xCaTi_aO_{1+2a}-(1-y)(1-x)Ca(M1_{z/3}M2_{2/3})_bO_{1+2b}-yLnAl_cO_{(3+3c)/2}$, in which M1 is at least one of Zn and Mg, M2 is at least one of Nb and Ta, Ln is at least one of Y, La, Nd, Sm and Pr, $\alpha=(1-y)x$, x and y denote moles, and x, y, z, a, b, c, and $\alpha$ satisfy the following relationships:

$0.56 \leq x \leq 0.8$;

$0.08 \leq y \leq 0.18$;

$0.980 \leq z < 1.000$;

$\alpha \leq 0.65$;

$0.985 \leq a \leq 1.05$;

$0.9 \leq b \leq 1.02$; and $0.9 \leq c \leq 1.05$.

2. A high-frequency dielectric ceramic composition according to claim 1, wherein M1 comprises Zn, M2 comprises Nb, $0.6 \leq x \leq 0.78$; $0.1 \leq y \leq 0.15$; and $\alpha \leq 0.64$.

3. A dielectric resonator comprising a dielectric ceramic having input and output terminals, wherein the dielectric ceramic is a high-frequency dielectric ceramic composition according to claim 2.

4. A dielectric filter comprising a dielectric resonator according to claim 3 and external couplers adapted to be connected to the input and output terminals of the dielectric resonator.

5. A dielectric duplexer comprising at least two of said dielectric filters, input and output connectors each connected to the respective dielectric filters, and an antenna connector connected to the dielectric filters, wherein at least one of the dielectric filters is a dielectric filter according to claim 4.

6. A high-frequency dielectric ceramic composition according to claim 1, containing 0.01-1 parts by weight of $V_2O_5$, $Cr_2O_3$, $MnO_2$, $Fe_2O_3$, NiO, CuO, $SiO_2$, $Li_2O$, $Pb_3O_4$, $Bi_2O_3$, $ZrO_2$, $WO_3$ or a combination thereof.

7. A high-frequency dielectric ceramic composition according to claim 6, containing 1-3 parts by weight of $BaCO_3$ or $SrCO_3$.

8. A dielectric resonator comprising a dielectric ceramic having input and output terminals, wherein the dielectric ceramic is a high-frequency dielectric ceramic composition according to claim 6.

9. A dielectric filter comprising a dielectric resonator according to claim 8 and external couplers adapted to be connected to said input and output terminals of the dielectric resonator.

10. A dielectric duplexer comprising at least of said two dielectric filters, input and output connectors each connected to the respective dielectric filters, and an antenna connector connected to the dielectric filters, wherein at least one of the dielectric filters is a dielectric filter according to claim 9.

11. A communication apparatus comprising a dielectric duplexer according to claim 10, a transmission circuit connected to at least one of said input and output connectors of the dielectric duplexer, a receiver circuit connected to at least one of said input and output connectors that is different from the at least one of input and output connectors connected to the transmission circuit, and an antenna connected to an antenna connector of the dielectric duplexer.

12. A high-frequency dielectric ceramic composition according to claim 1, containing 1-3 parts by weight of $BaCO_3$ or $SrCO_3$.

13. A dielectric resonator comprising a dielectric ceramic having input and output terminals, wherein the dielectric ceramic is a high-frequency dielectric ceramic composition according to claim 12.

14. A dielectric filter comprising a dielectric resonator according to claim 13 and external couplers adapted to be connected to the input and output terminals of the dielectric resonator.

15. A dielectric duplexer comprising at least two of said dielectric filters, input and output connectors each connected to the respective dielectric filters, and an antenna connector connected to the dielectric filters, wherein at least one of the dielectric filters is a dielectric filter according to claim 14.

16. A communication apparatus comprising the dielectric duplexer according to claim 15, a transmission circuit connected to at least one of said input and output connectors of the dielectric duplexer, a receiver circuit connected to at least one of said input and output connectors that is different from the at least one of input and output connectors connected to the transmission circuit, and an antenna connected to an antenna connector of the dielectric duplexer.

17. A dielectric resonator comprising a dielectric ceramic having input and output terminals, wherein the dielectric ceramic is a high-frequency dielectric ceramic composition according to claim 1.

18. A dielectric filter comprising a dielectric resonator according to claim 17 and external couplers adapted to be connected to the input and output terminals of the dielectric resonator.

19. A dielectric duplexer comprising at least two of said dielectric filters, input and output connectors each connected to the respective dielectric filters, and an antenna connector connected to the dielectric filters, wherein at least one of the dielectric filters is a dielectric filter according to claim 18.

20. A communication apparatus comprising the dielectric duplexer according to claim 19, a transmission circuit connected to at least one of said input and output connectors of the dielectric duplexer, a receiver circuit connected to at least one of said input and output connectors that is different from the at least one of input and output connectors connected to the transmission circuit, and an antenna connected to an antenna connector of the dielectric duplexer.

* * * * *